United States Patent
Endo et al.

(10) Patent No.: US 7,718,107 B2
(45) Date of Patent: May 18, 2010

(54) MOLD FOR GOLF BALL

(75) Inventors: Seiichiro Endo, Kobe (JP); Takahiro Sajima, Kobe (JP)

(73) Assignee: SRI Sports Limited, Kobe (JP)

( * ) Notice: Subject to any disclaimer, the term of this patent is extended or adjusted under 35 U.S.C. 154(b) by 738 days.

(21) Appl. No.: 10/849,824

(22) Filed: May 21, 2004

(65) Prior Publication Data

US 2004/0251576 A1 Dec. 16, 2004

(30) Foreign Application Priority Data

Jun. 11, 2003 (JP) .............................. 2003-166091

(51) Int. Cl.
B29C 45/14 (2006.01)
B29C 45/00 (2006.01)

(52) U.S. Cl. .................... 264/278; 264/259; 264/271.1; 264/279; 264/279.1; 264/328.12; 264/275; 264/328.8; 425/116; 425/120; 425/573; 425/577; 425/812

(58) Field of Classification Search ........................ None
See application file for complete search history.

(56) References Cited

U.S. PATENT DOCUMENTS

| | | | | | |
|---|---|---|---|---|---|
| 4,959,000 | A | * | 9/1990 | Giza | ........................... 425/116 |
| 5,112,556 | A | * | 5/1992 | Miller | ......................... 264/279 |
| 6,089,847 | A | * | 7/2000 | Inoue et al. | .................. 425/116 |
| 6,093,360 | A | * | 7/2000 | Inoue et al. | ................. 264/278 |
| 6,129,881 | A | * | 10/2000 | Puniello | ...................... 264/278 |
| 6,190,597 | B1 | | 2/2001 | Inoue et al. | |
| 6,379,138 | B1 | * | 4/2002 | Puniello et al. | ............. 425/116 |
| 6,478,695 | B1 | | 11/2002 | Inoue et al. | |
| 6,817,852 | B2 | * | 11/2004 | Lavallee | ...................... 425/116 |
| 6,893,359 | B2 | * | 5/2005 | Shimosaka | ................... 473/351 |
| 2006/0038321 | A1 | * | 2/2006 | Tzivanis et al. | ........... 264/271.1 |
| 2006/0043632 | A1 | * | 3/2006 | Andersen | ..................... 264/161 |

FOREIGN PATENT DOCUMENTS

| | | |
|---|---|---|
| JP | 11-151323 | 6/1999 |
| JP | 2000-37480 A | 2/2000 |
| JP | 2000-141430 A | 5/2000 |
| JP | 2004322347 A * | 11/2004 |

\* cited by examiner

*Primary Examiner*—Jeffrey Wollschlager
(74) *Attorney, Agent, or Firm*—Birch, Stewart, Kolasch & Birch LLP

(57) ABSTRACT

A mold (1) includes an upper mold half (U) and a lower mold half (L). The mold (1) includes a gate (G), a pole vent pin (P), a support pin (S) and an intermediate vent pin (M). The support pin (S) has a latitude (θs) of 45 degrees to 85 degrees. Each of the upper mold half (U) and the lower mold half (L) has at least three support pins (S). The intermediate vent pin (M) has a latitude (θm) of 45 degrees to 85 degrees. Each of the upper mold half (U) and the lower mold half (L) has at least three intermediate vent pins (M). A difference between the latitude (θm) of the intermediate vent pin (M) and the latitude (θs) of the support pin (S) is equal to or smaller than 15 degrees. A clearance between the intermediate vent pin (M) and a pin hole (13) is 5 μm to 50 μm. By the mold (1), a cover having a thickness of 1.4 mm or less is formed.

10 Claims, 9 Drawing Sheets

MOLD FOR GOLF BALL

This application claims priority on Patent Application No. 2003-166091 filed in JAPAN on Jun. 11, 2003.

BACKGROUND OF THE INVENTION

1. Field of the Invention

The present invention relates to a mold for a golf ball and a method of manufacturing a golf ball. More particularly, the present invention relates to an improvement in a mold to be used for forming the cover of a golf ball.

2. Description of the Related Art

A two pieces golf ball is constituted by a core and a cover covering the surface of the core. In the manufacture of the two pieces golf ball, a mold including an upper mold half and a lower mold half which have hemispherical cavities is used. By uniting the upper mold half and the lower mold half, a spherical cavity is formed. The mold includes a support pin capable of being moved forward and backward with respect to the cavity and a vent pin for causing the cavity and outside air to communicate with each other. The vent pins are provided on the poles of the upper mold half and the lower mold half. By the support pins which are moved forward, the core is held on the center of the cavity. Then, a resin composition is put in an injection molding machine and is thus molten, and is injected toward the cavity through a plurality of gates. The resin composition thus molten is filled in a portion between a cavity surface and the core. The molten resin composition covers the core and coagulates to form a cover shortly.

In a stage in which the core is held by the support pin, air is present between the cavity surface and the core. When the molten resin composition is injected into the cavity, the air in the cavity is discharged to an outside. The discharge is carried out through a clearance of the support pin and the vent pin. There has also been proposed a mold in which a support pin formed by a porous material is used and the air is discharged from the support pin (Japanese Laid-Open Patent Publication No. 2000-37480).

If the discharge of the air is insufficient, there are caused defects such as the generation of bare, the intrusion of the air into the cover, the scorching of a resin or the generation of a weld mark. In the formation of a thin cover, the molten resin composition is fluidized with difficulty. Consequently, the defects are particularly apt to be caused.

The tip of the support pin which is moved forward is protruded from the cavity surface. The tip hinders the fluidization of the molten resin composition. If the fluidization is insufficient, the defects are apt to be caused.

In some cases in which the support pin is moved backward, the molten resin composition stuck onto the surface of the support pin is brought into the clearance. When the molten resin composition remains, the discharge of the air from the clearance is inhibited. The invasion of the molten resin composition into the clearance highly increases the proportion defective of a golf ball.

In recent years, a golf ball including a cover having a small thickness has been manufactured. In the formation of the cover, a molten resin composition tends to be non-fluidized smoothly due to a small interval between the cavity surface and the core. In the formation of the cover having a small thickness, generally, a polymer having a low viscosity is selected or the temperature of a resin is set to be high in order to enhance the fluidity of the molten resin composition. The molten resin composition having an excellent fluidity is apt to enter the clearance. In the manufacture of the golf ball including the cover having a small thickness, a yield is low.

There is also a golf ball including a cover formed by at least two layers. Also in the formation of each layer of the golf ball, there is a problem in that the air remains.

It is an object of the present invention to provide a mold for a golf ball in which air is easily discharged. It is another object of the present invention to provide a method of manufacturing a golf ball in which a golf ball of good quality can be obtained and a yield is high.

SUMMARY OF THE INVENTION

The present invention provides a mold for a golf ball comprising an upper mold half and a lower mold half. Each of the upper mold half and the lower mold half includes a vent pin positioned on a pole, at least three support pins having latitudes θs of 45 degrees to 85 degrees, and at least three intermediate vent pins having latitudes θm of 45 degrees to 85 degrees. In the mold, the intermediate vent pin is provided in a portion other than the pole. Consequently, the air is also discharged from the clearance of the intermediate vent pin. Since the intermediate vent pin is not moved forward and backward, the invasion of a polymer composition into the clearance is caused with difficulty. In the mold, air can be inhibited from remaining.

It is preferable that all of the support pins should be provided at the same latitude in each of the upper mold half and the lower mold half. In the mold, the stroke of the support pin is unified. The mold can easily be manufactured.

It is preferable that each of the upper mold half and the lower mold half should include at least three intermediate vent pins having the latitudes θm with a difference of 15 degrees or less from the latitudes θs of the support pins. The intermediate vent pins contribute to the discharge of the air in a portion in which a fluidization is apt to be hindered.

It is preferable that a clearance between the intermediate vent pin and a pin hole should be 5 μm to 50 μm. The golf ball obtained by the mold has an excellent appearance.

The present invention provides a method of manufacturing a golf ball comprising the steps of:

(1) putting a core in a mold including an upper mold half and a lower mold half and including a substantially spherical cavity and a plurality of gates, each of the upper mold half and the lower mold half containing a vent pin positioned on a pole, at least three support pins having latitudes θs of 45 degrees to 85 degrees, and at least three intermediate vent pins having latitudes θm of 45 degrees to 85 degrees; and (2) injecting a polymer composition into a cavity through a gate while discharging air present in the cavity from a clearance of the intermediate vent pin. By the manufacturing method, a golf ball of good quality can be obtained.

DESCRIPTION OF THE PREFERRED EMBODIMENTS

A preferred embodiment of the present invention will be described below in detail with reference to the drawings.

Figure 1:
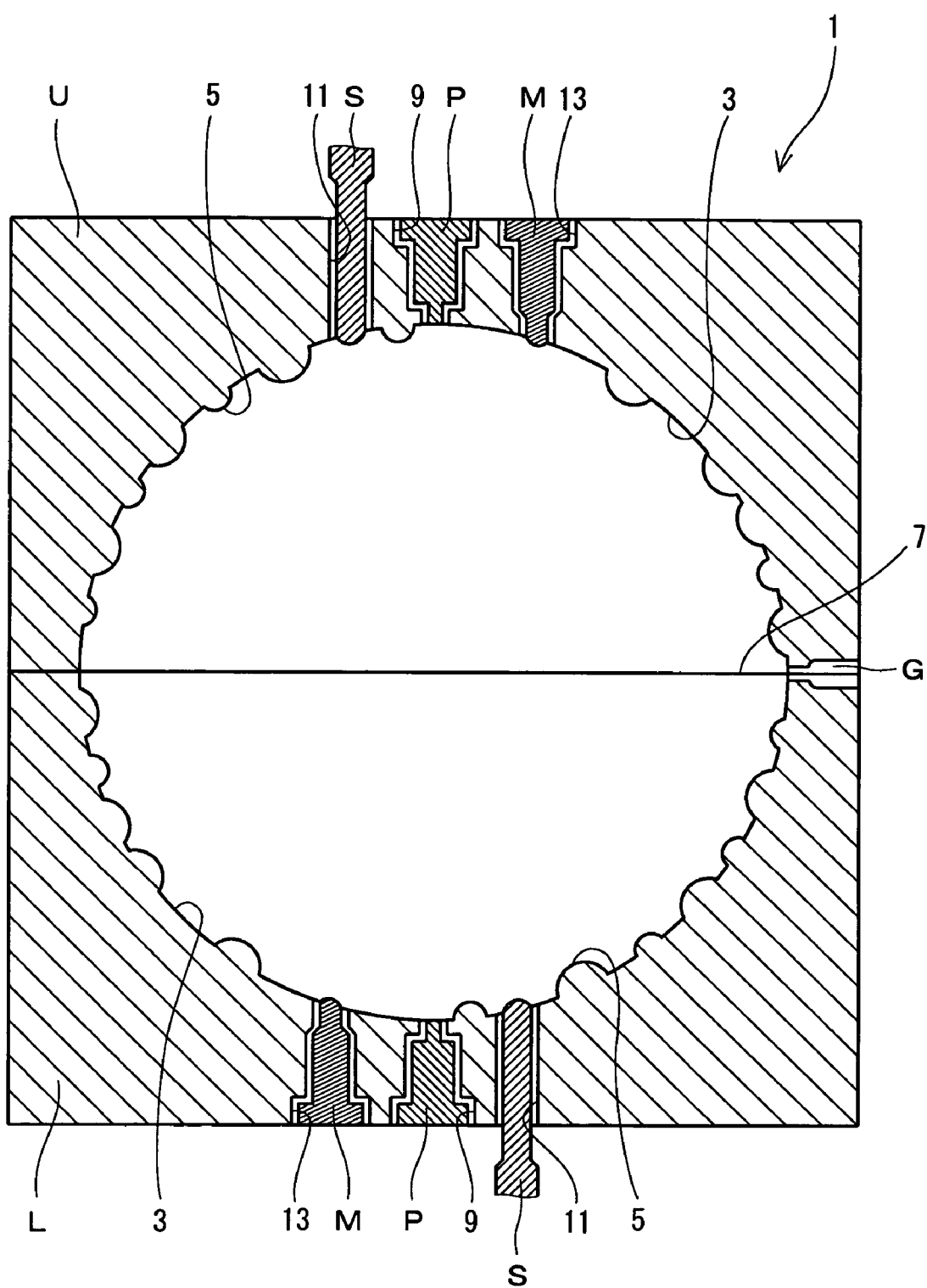
FIG. 1 is a sectional view showing a mold for a golf ball according to an embodiment of the present invention.

A mold 1 for a golf ball shown in FIG. 1 comprises an upper mold half U and a lower mold half L. Each of the upper mold half U and the lower mold half L includes a hemispherical cavity surface 3. In FIG. 1, the upper mold half U and the lower mold half L are united so that a spherical cavity is formed. A large number of pimples 5 are formed on the cavity surface 3. The pimple 5 takes a shape obtained by inverting the shape of a dimple. When it is assumed that the deepest portion of the cavity surface 3 of the upper mold half U is the north pole of a globe and the deepest portion of the cavity surface 3 of the lower mold half L is the south pole of the globe, a parting line 7 between the upper mold half U and the lower mold half L corresponds to an equator. In this specification, a position on the cavity surface 3 is expressed in spherical polar coordinates of ($\theta$, $\phi$). $\theta$ corresponds to the north latitude or south latitude of the globe. The latitude $\theta$ ranges from 0 degree to 90 degrees. $\phi$ corresponds to the longitude of the globe.

Figure 2:
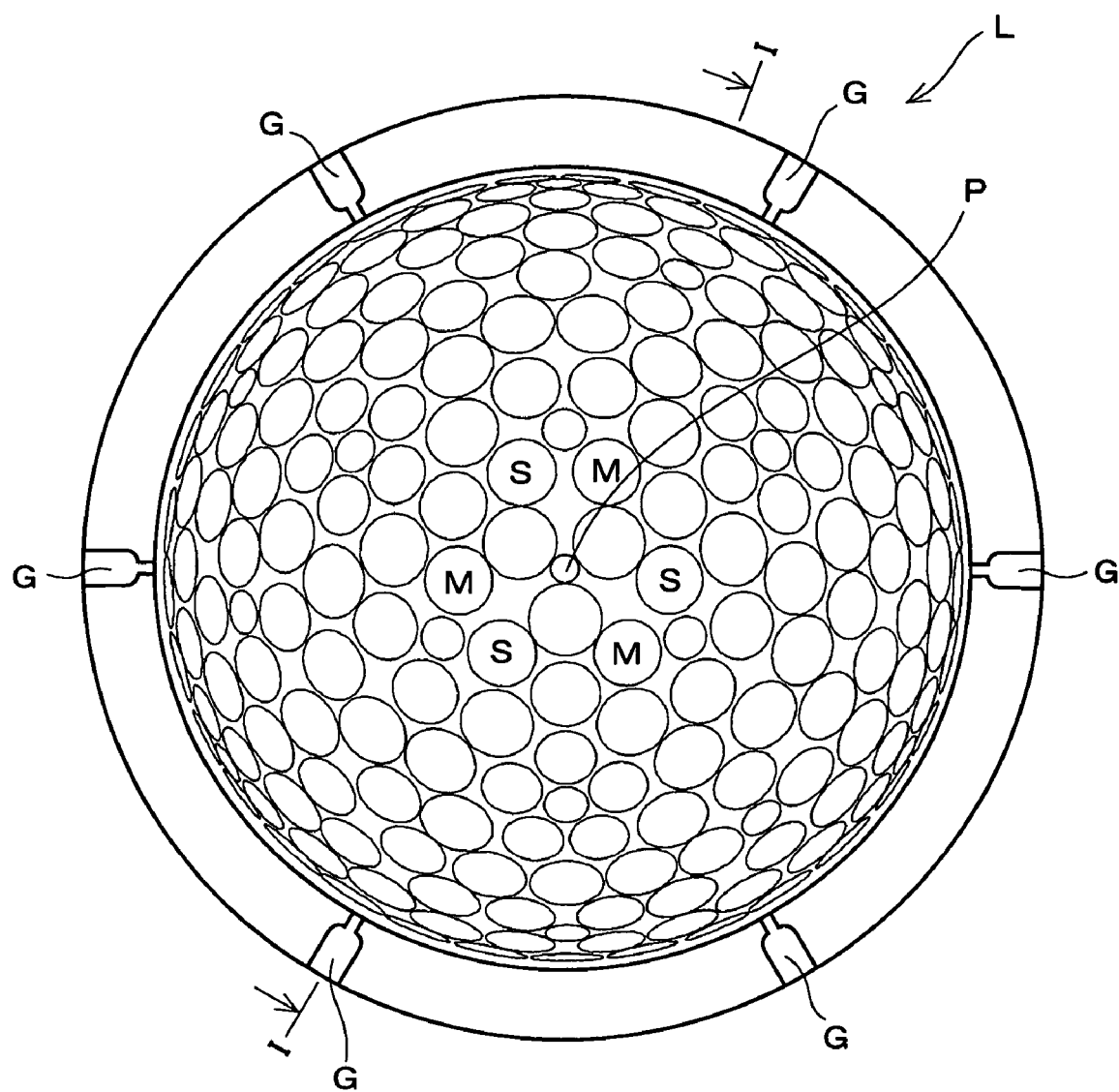
FIG. 2 is a plan view showing the lower mold half of the mold in FIG. 1.

FIG. 2 is a plan view showing the lower mold half L of the mold 1 in FIG. 1. FIG. 1 is a sectional view taken along a I-I line in FIG. 2. A bottom view showing the upper mold half U takes a shape obtained by vertically inverting FIG. 2, which is not shown. Each of the upper mold half U and the lower mold half L has six gates G. The gates G are provided at regular intervals. A difference between the longitudes $\phi$ of the adjacent gates G is 60 degrees.

Each of the upper mold half U and the lower mold half L has one pole vent pin P, three support pins S and three intermediate vent pins M. The tip of the pole vent pin P is coincident with the pole of the cavity surface 3. In other words, the latitude $\theta$ of the tip of the pole vent pin P is 90 degrees. Latitudes $\theta$s of the three support pins S are identical to each other. The latitude $\theta$s represents the position of the center of the tip of the support pin S in a state in which the support pin S is moved backward. Latitudes $\theta$m of the three intermediate vent pins M are identical to each other. The pole vent pin P, the support pin S and the intermediate vent pin M are formed of carbon steel, alloy steel, an aluminum alloy or the like. These pins may be formed by porous materials.

As shown in FIG. 1, the pole vent pin P is inserted in a pin hole 9. A clearance between the pole vent pin P and the pin hole 9 causes the outside of the mold 1 to communicate with the spherical cavity. The support pin S is inserted in a pin hole 11. A clearance between the support pin S and the pin hole 11 causes the outside of the mold 1 to communicate with the spherical cavity. The intermediate vent pin M is inserted in a pin hole 13. A clearance between the intermediate vent pin M and the pinhole 13 causes the outside of the mold 1 to communicate with the spherical cavity. As shown in FIG. 1, the tip of the pole vent pin P is flat, and the tips of the support pin S and the intermediate vent pin M are convex-shaped. The pole vent pin P, the support pin S and the intermediate vent pin M have circular cross sections.

In this specification, the support pin S implies a pin which is provided for holding the core and can be moved forward and backward with respect to the cavity. The support pin S is moved by means which is not shown (for example, a hydraulic cylinder). The support pin S also contributes to the discharge of the air. In this specification, the vent pins P and M imply pins which are provided for discharging the air and cannot be moved forward and backward with respect to the cavity.

In order to manufacture a golf ball by an injection molding method using the mold 1, first of all, the core is put in the cavity of the lower mold half L. Next, mold clamping is carried out so that the support pin S is moved forward. By the forward movement, the support pin S holds the core. The core is positioned on the center of the spherical cavity. The air is present between the cavity surface 3 and the core. Subsequently, the molten resin composition passes through the gate G and is injected into the spherical cavity. The molten resin composition is fluidized toward the pole. With the fluidization, the air present between the cavity surface 3 and the core is gradually discharged to the outside. The discharge is carried out through the clearance of the pole vent pin P, the support pin S and the intermediate vent pin M. Immediately before the molten resin composition is completely injected, the support pin S is moved backward. The tip of the support pin S is separated from the core. Since the resin composition is present between the core and the cavity surface 3, however, the core is rarely moved. After the molten resin composition is completely injected and coagulates, the mold 1 is opened to take out the golf ball. The golf ball includes the core and the cover formed of the resin composition. A dimple taking a shape obtained by inverting the pimple 5 is formed on the surface of the cover. By the tips of the support pin S and the intermediate vent pin M, similarly, the dimple is formed. A spew is generated in a portion corresponding to the clearance over the surface of the golf ball. In the case in which the size of the spew is large, the spew is removed by grinding.

In respect of the discharge of the air, it is preferable that the vicinity of the tip of the pole vent pin P should have a diameter of 1.0 mm to 5.0 mm. In some cases in which the diameter is smaller than the range, the discharge of the air is insufficient because the clearance is small. When the diameter exceeds the range, the air present between the clearance and the pole is apt to remain.

It is preferable that the clearance between the pole vent pin P and the pinhole 9 should be 5 μm to 50 μm. If the clearance is smaller than the range, the air is apt to remain. From this viewpoint, it is more preferable that the clearance should be equal to or greater than 10 μm. If the clearance exceeds the range, a spew having a large size is apt to be generated. From this viewpoint, it is more preferable that the clearance should be equal to or smaller than 45 μm and it is particularly preferable that the clearance should be equal to or smaller than 40 μm. In this specification, the clearance implies a value obtained by decreasing the radius of a pin from that of a hole.

In order to hold the core, it is necessary to provide at least three support pins S in each of the upper mold half and the lower mold half. If the number of the support pins S is too large, the fluidization of the molten resin composition is hindered. For this reason, it is preferable that the number should be equal to or smaller than six. In the mold 1 shown in FIG. 2, the latitude $\theta$s of the support pin S is 74.26 degrees. It is preferable that the latitude $\theta$s should be 45 degrees to 85 degrees. In some cases in which the latitude $\theta$s is smaller than the range, the durability of the golf ball becomes insufficient because the temperature of the molten resin composition coming in contact with the support pin S is low when the support pin S is transferred from a forward moving state to a backward moving state. From this viewpoint, it is more preferable that the latitude θs should be equal to or greater than 55 degrees. If the latitude θs exceeds the range, the eccentricity of the core is apt to be generated because the core is held unstably at an injecting step. From this viewpoint, it is more preferable that the latitude θs should be equal to or smaller than 80 degrees and it is particularly preferable that the latitude θs should be equal to or smaller than 75 degrees. In the case in which the support pins S having different latitudes θs from each other are to be provided, it is preferable that the number of the support pins S having latitudes θs of 45 degrees to 85 degrees should be 3 to 6. It is preferable that the latitudes θs of all the support pins S should be 45 degrees to 85 degrees. In respect of the unification of strokes, it is preferable that all of the support pins S should be provided at the same latitude. It is easy to manufacture the mold 1 having the strokes of all the support pins S which are identical to each other.

It is preferable that the vicinity of the tip of the support pin S should have a diameter of 2.0 mm to 5.5 mm. If the diameter is smaller than the range, the air is apt to remain. From this viewpoint, it is more preferable that the diameter should be equal to or greater than 2.4 mm and it is particularly preferable that the diameter should be equal to or greater than 3.0 mm. In some cases in which the diameter exceeds the range, the fluidity of the molten resin composition is hindered. From this viewpoint, it is more preferable that the diameter should be equal to or smaller than 5.0 mm and it is particularly preferable that the diameter should be equal to or smaller than 4.5 mm. In the case in which the tip corresponds to a land (a region other than the dimple in the surface of the golf ball), a support pin having a flat tip or a support pin having a tip concaved along the cavity surface 3 is used. The area of the land of a general golf ball is small. In the case in which the same tip corresponds to the land, therefore, it is necessary to set the diameter of the support pin to be small. In the case in which the support pin is thin, the air is apt to remain as described above. In respect of the discharge of the air, a support pin S having a tip corresponding to the dimple is preferable.

It is preferable that the clearance between the support pin S and the pin hole 11 should be 5 μm to 50 μm. If the clearance is smaller than the range, the air is apt to remain. From this viewpoint, it is more preferable that the clearance should be equal to or greater than 10 μm. If the clearance exceeds the range, a spew having a large size is apt to be generated. From this viewpoint, it is more preferable that the clearance should be equal to or smaller than 45 μm and it is particularly preferable that the clearance should be equal to or smaller than 40 μm.

The air is discharged from the clearance of the support pin S as described above. In respect of the discharge, therefore, more support pins S are preferable. On the other hand, in the case in which the number of the support pins S is too large, the fluidization is hindered. In addition, when the support pin S is transferred from the forward moving state to the backward moving state, the molten resin composition might be brought into the clearance to block the clearance. In the mold 1 shown in FIG. 1, the intermediate vent pin M is provided together with the support pin S as described above, and the air is also discharged from the clearance of the intermediate vent pin M. Since the intermediate vent pin M is not protruded from the cavity surface, the fluidization is not hindered. In addition, since the intermediate vent pin M is not moved forward and backward, the molten resin composition is not brought into the clearance. The support pin S and the intermediate vent pin M are provided together. Consequently, it is possible to prevent defects from being caused by the insufficient discharge of the air and defects from being caused by the hindrance of the fluidization.

In respect of the discharge of the air, it is necessary to provide at least three intermediate vent pins M in each of the upper mold half and the lower mold half. If the number of the intermediate vent pins M is too large, the structure of the mold 1 becomes complicated. For this reason, it is preferable that the number should be equal to or smaller than 15 and it is particularly preferable that the number should be equal to or smaller than 12. In the mold 1 shown in FIG. 2, the latitude θm of the intermediate vent pin M is 74.26 degrees. It is preferable that the latitude θm should be 45 degrees to 85 degrees. If the latitude θm is smaller than the range, the clearance is blocked in the initial stage of the injecting step. For this reason, the air is apt to remain. From this viewpoint, it is more preferable that the latitude θm should be equal to or greater than 49 degrees and it is particularly preferable that the latitude θm should be equal to or greater than 59 degrees. If the latitude θm exceeds the range, the strength of the mold 1 becomes insufficient because an interval between the adjacent pin holes 13 is small. From this viewpoint, the latitude θm is more preferably 83 degrees or less, further preferably 80 degrees or less, and particularly preferably 75 degrees or less. In the case in which the intermediate vent pins M having different latitudes θm from each other are provided, the number of the intermediate vent pins M having latitudes θm of 45 degrees to 85 degrees is set to be three or more.

It is preferable that a difference between the latitude θm of the intermediate vent pin M and the latitude θs of the support pin S should be equal to or smaller than 15 degrees. In other words, it is preferable that the latitude θm and the latitude θs should satisfy the following expression.

$$-15° \leq (\theta m - \theta s) \leq 15°$$

The intermediate vent pin M having the latitude θm to satisfy the expression is provided close to the support pin S. Although the air is apt to remain due to the hindrance of the fluidization in the vicinity of the support pin S, the intermediate vent pin M is close to the support pin S so that the air can be prevented from being remaining. In the case in which the intermediate vent pins M having different latitudes θm from each other are to be provided, it is preferable that the number of the intermediate vent pins M to satisfy the expression in each of the upper mold half U and the lower mold half L should be equal to or larger than three. In respect of the suppression of the air remaining, it is more preferable that a difference between the latitude θm of the intermediate vent pin M and the latitude θs of the support pin S should be equal to or smaller than 10 degrees and it is particularly preferable that the difference should be equal to or smaller than 6 degrees.

It is preferable that the vicinity of the tip of the intermediate vent pin M should have a diameter of 2.0 mm to 5.0 mm. If the diameter is smaller than the range, the air is apt to remain. From this viewpoint, it is more preferable that the diameter should be equal to or greater than 2.4 mm and it is particularly preferable that the diameter should be equal to or greater than 3.0 mm. In some cases in which the diameter exceeds the range, the air remains just above the intermediate vent pin M or the fluidity of the molten resin composition is hindered. From this viewpoint, it is more preferable that the diameter should be equal to or smaller than 4.5 mm. In the case in which the tip corresponds to the land, an intermediate vent pin having a flat tip is used. The area of the land of a general golf ball is small. In the case in which the same tip corresponds to the land, therefore, it is necessary to set the diameter of the intermediate vent pin to be small. In the case in which the intermediate vent pin is thin, the air is apt to remain as described above. In respect of the discharge of the air, an intermediate vent pin M having a tip corresponding to the dimple is preferable.

It is preferable that the clearance between the intermediate vent pin M and the pin hole 13 should be 5 μm to 50 μm. If the clearance is smaller than the range, the air is apt to remain. From this viewpoint, it is more preferable that the clearance should be equal to or greater than 10 μm. If the clearance exceeds the range, a spew having a large size is apt to be generated. From this viewpoint, it is more preferable that the clearance should be equal to or smaller than 45 μm and it is particularly preferable that the clearance should be equal to or smaller than 40 μm.

It is preferable that the number of the gates G in each of the upper mold half U and the lower mold half L should be 4 to 24. If the number of the gates G is smaller than the range, the thickness of the cover is apt to become nonuniform. From this viewpoint, it is more preferable that the number of the gates G should be equal to or greater than six. If the number of the gates G exceeds the range, the structure of the mold 1 becomes complicated. From this viewpoint, the number of the gates G is preferably 20 or less, further preferably 18 or less and particularly preferably 12 or less.

The mold 1 is suitable for forming a cover having a small thickness. In the formation of the cover having the small thickness, the fluidization of the molten resin composition becomes insufficient so that the air is apt to remain because an interval between a cavity surface and a core at an injecting step is small. By using the mold 1 according to the present invention, the cover having the small thickness can be formed stably. More specifically, in the case in which a difference between the inside radius of the cavity and the radius of the core at the injecting step is 0.3 mm to 1.4 mm, the present invention is effective. In the case in which the difference between the inside radius of the cavity and the radius of the core at the injecting step is equal to or smaller than 1.3 mm, the mold is particularly effective.

The cover usually contains a thermoplastic elastomer or an ionomer resin as a main component. A specific example of the thermoplastic elastomer includes a thermoplastic polyurethane elastomer, a thermoplastic styrene elastomer, a thermoplastic polyamide elastomer and a thermoplastic polyester elastomer. Also in the case in which a polymer having a low viscosity is used for the cover, the intermediate vent pin M does not bring the molten resin composition therein. Therefore, the air remains with difficulty. The mold 1 is particularly suitable for the formation of the cover containing the thermoplastic polyurethane elastomer as a main component. More specifically, the mold 1 is suitable for the formation of a cover having the ratio of the thermoplastic polyurethane elastomer to a base polymer which is equal to or higher than 50% by weight, particularly 70% by weight.

The mold according to the present invention can also be used for the formation of the inside cover of a golf ball including a cover having at least two layers. In the case in which the inside cover is to be formed, the pimple is not provided on the cavity surface. In the case in which the inside cover is to be formed, the tips of all the pins P, S and M are flat.

The mold according to the present invention can also be used for the formation of a cover comprising a rubber composition.

Figure 3:
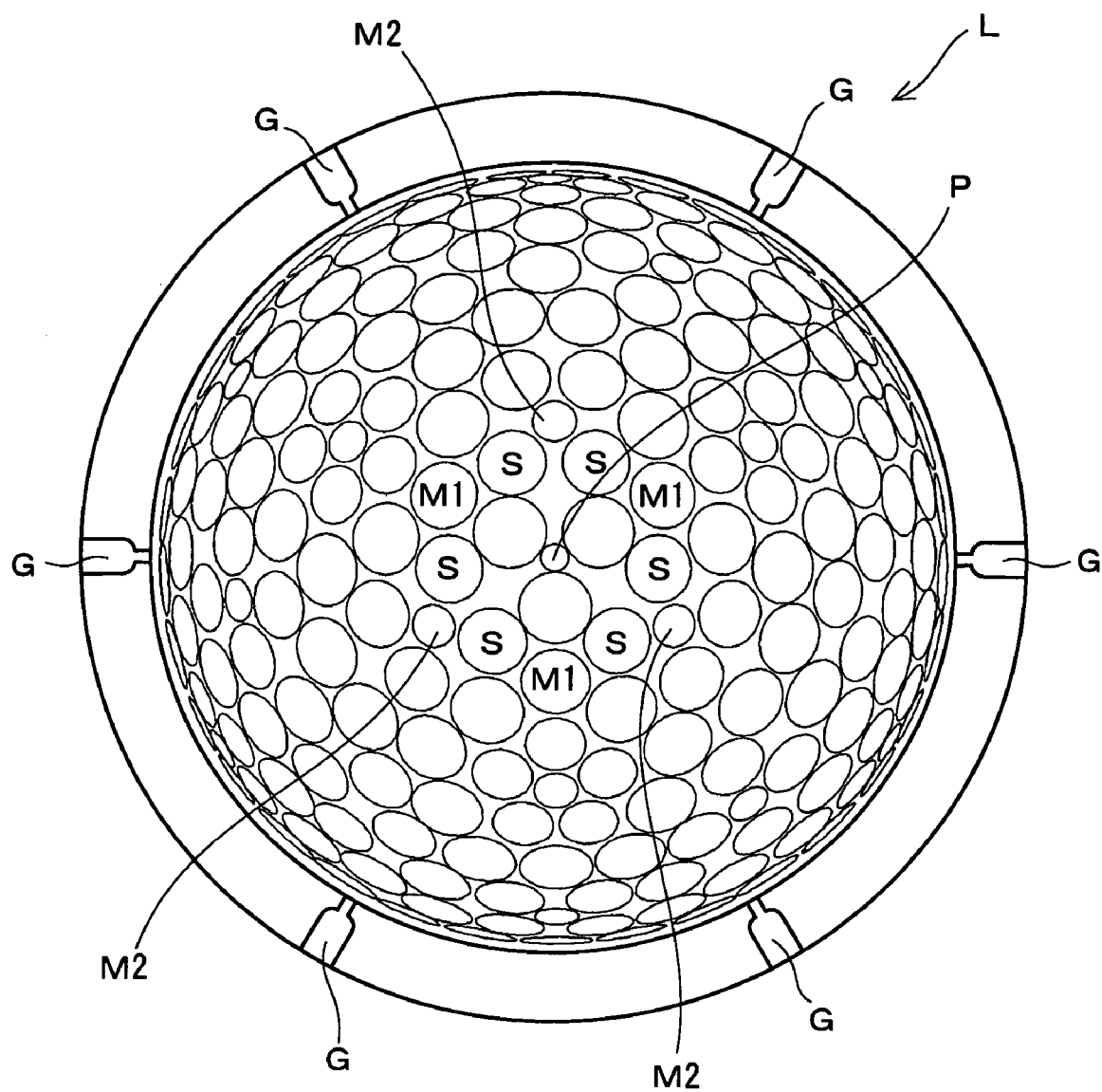
FIG. 3 is a plan view showing the lower mold half of a mold according to another embodiment of the present invention.

FIG. 3 is a plan view showing a lower mold half L of a mold according to another embodiment of the present invention. The bottom view of an upper mold half U takes a shape obtained by vertically inverting FIG. 3. Each of the upper mold half U and the lower mold half L has six gates G, one pole vent pin P, six support pins S, three first intermediate vent pins M1 and three second intermediate vent pins M2. In the mold, a latitude θs of the support pin S is 74.26 degrees, a latitude θm of the first intermediate vent pin M1 is 71.00 degrees, and the latitude θm of the second intermediate vent pin M2 is 69.06 degrees. In other words, all of the support pins S, the first intermediate vent pins M1 and the second intermediate vent pins M2 are provided in regions having latitudes of 45 degrees to 85 degrees. A difference between the latitude θm of the first intermediate vent pin M1 and the latitude θs of the support pin S is 3.26 degrees. A difference between the latitude θm of the second intermediate vent pin M2 and the latitude θs of the support pin S is 5.20 degrees. In the mold, defects are suppressed by the intermediate vent pins M1 and M2.

Figure 4:
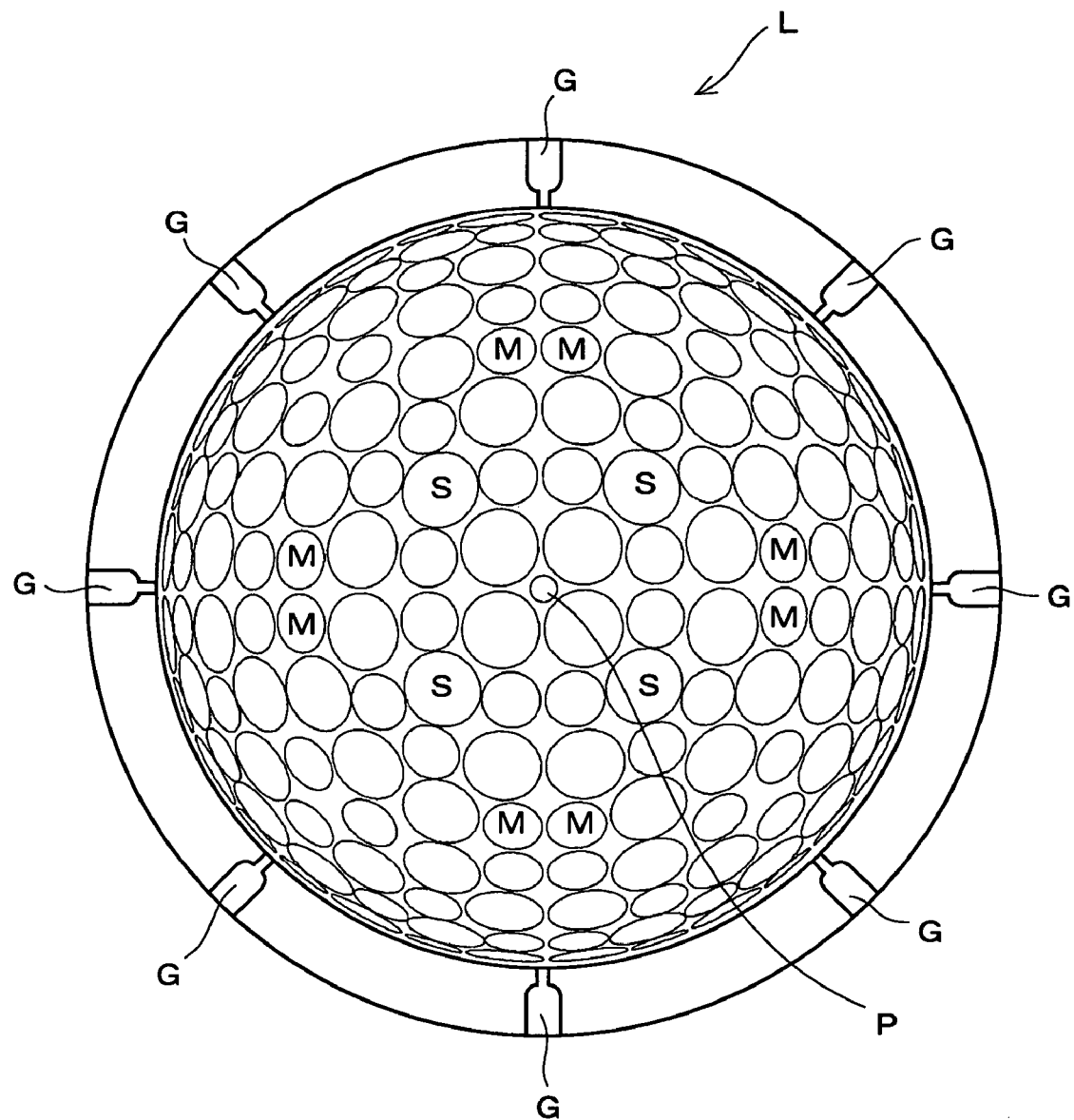
FIG. 4 is a plan view showing the lower mold half of a mold according to yet another embodiment of the present invention.

FIG. 4 is a plan view showing a lower mold half L of a mold according to yet another embodiment of the present invention. The bottom view of an upper mold half U takes the same shape as that of FIG. 4. Each of the upper mold half U and the lower mold half L has eight gates G, one pole vent pin P, four support pins S and eight intermediate vent pins M. In the mold, a latitude θs of the support pin S is 67.50 degrees and a latitude θm of the intermediate vent pin M is 49.65 degrees. In other words, all of the support pins S and the intermediate vent pins M are provided in regions having latitudes of 45 degrees to 85 degrees. A difference between the latitude θm of the intermediate vent pin M and the latitude θs of the support pin S is 17.85 degrees. Also in the mold, defects are suppressed by the intermediate vent pins M.

Figure 5:
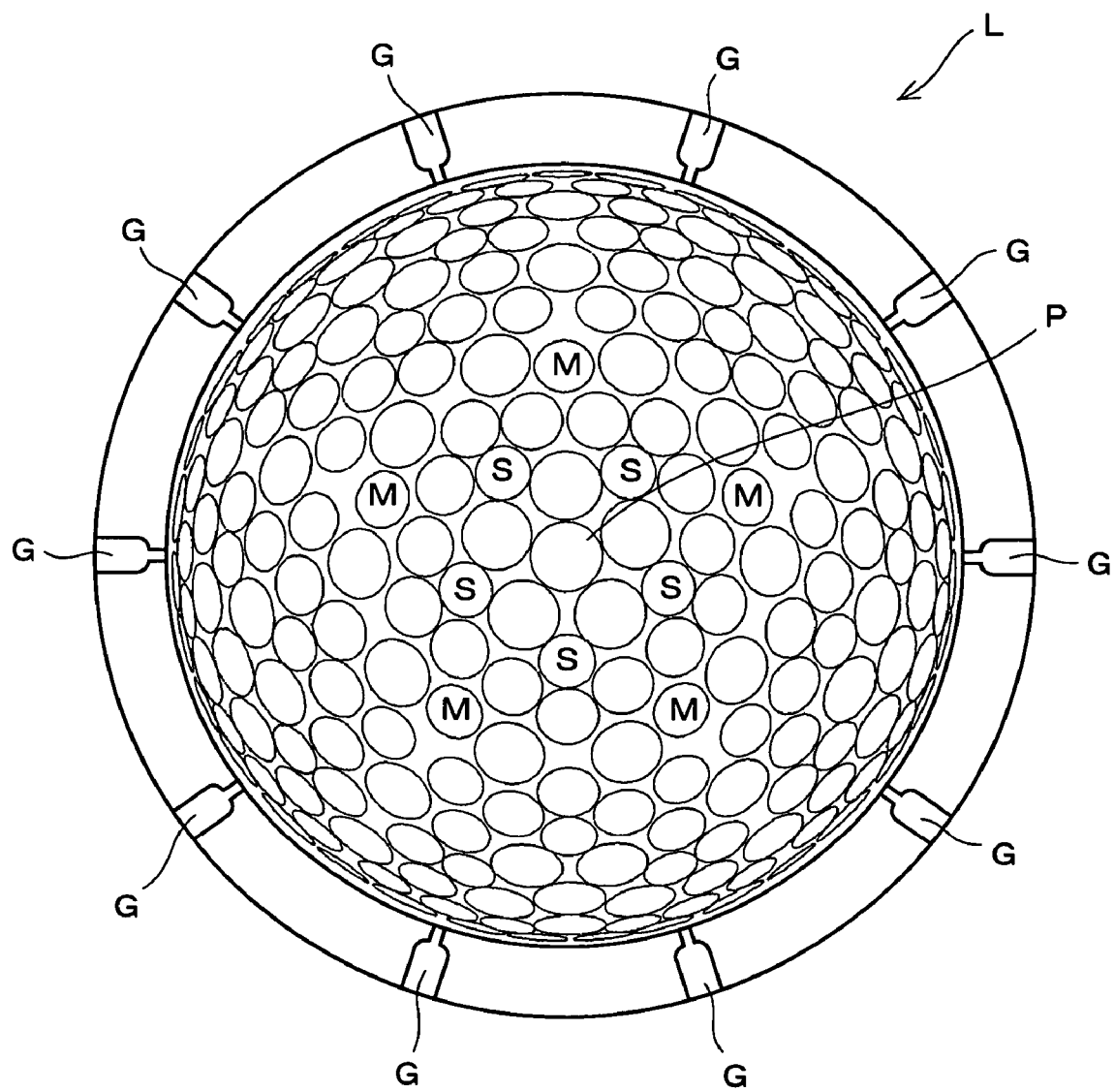
FIG. 5 is a plan view showing the lower mold half of a mold according to a further embodiment of the present invention.

FIG. 5 is a plan view showing a lower mold half L of a mold according to a further embodiment of the present invention. The bottom view of an upper mold half U takes a shape obtained by vertically inverting FIG. 5. Each of the upper mold half U and the lower mold half L has ten gates G, one pole vent pin P, five support pins S and five intermediate vent pins M. In the mold, a latitude θs of the support pin S is 73.84 degrees and a latitude θm of the intermediate vent pin M is 59.63 degrees. In other words, all of the support pins S and the intermediate vent pins M are provided in regions having latitudes of 45 degrees to 85 degrees. A difference between the latitude θm of the intermediate vent pin M and the latitude θs of the support pin S is 14.21 degrees. Also in the mold, defects are suppressed by the intermediate vent pins M.

Figure 6:
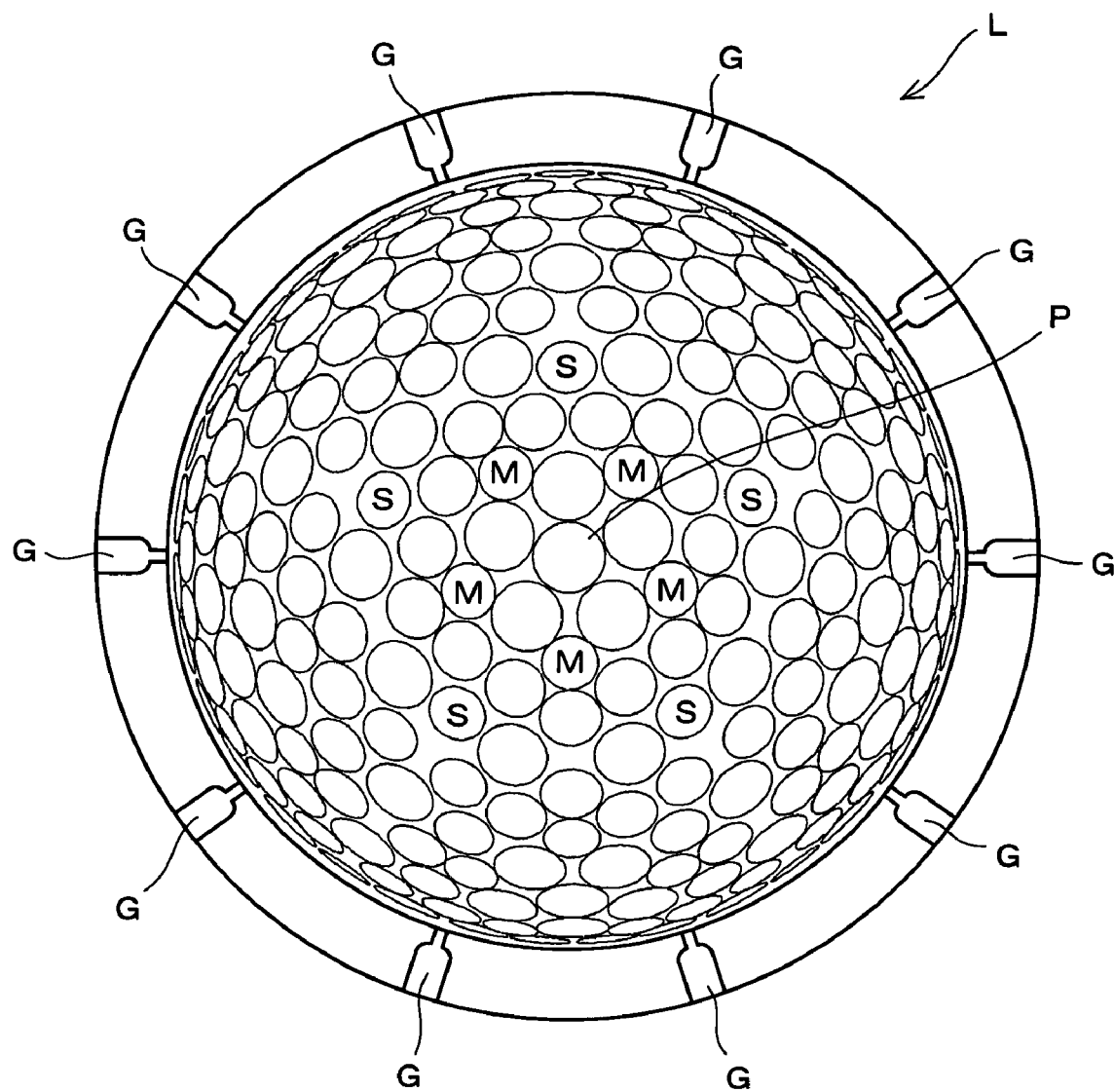
FIG. 6 is a plan view showing the lower mold half of a mold according to a further embodiment of the present invention.

FIG. 6 is a plan view showing a lower mold half L of a mold according to a further embodiment of the present invention. The bottom view of an upper mold half U takes a shape obtained by vertically inverting FIG. 6. Each of the upper mold half U and the lower mold half L has ten gates G, one pole vent pin P, five support pins S and five intermediate vent pins M. In the mold, a latitude θs of the support pin S is 59.63 degrees and a latitude θm of the intermediate vent pin M is 73.84 degrees. In other words, all of the support pins S and the intermediate vent pins M are provided in regions having latitudes of 45 degrees to 85 degrees. A difference between the latitude θm of the intermediate vent pin M and the latitude θs of the support pin S is 14.21 degrees. Also in the mold, defects are suppressed by the intermediate vent pins M.

EXAMPLES

Example 1

100 parts by weight of polybutadiene (trade name of "BR01" manufactured by JSR Co., Ltd.), 29.5 parts by weight of zinc acrylate, 8 parts by weight of zinc oxide, a predetermined amount of barium sulfate, and 0.8 part by weight of dicumyl peroxide were kneaded so that a rubber composition was obtained. The rubber composition was put in a mold and was held for 23 minutes at a temperature of 160° C. so that a spherical core having a diameter of 41.1 mm was obtained. On the other hand, 70 parts by weight of a thermoplastic polyurethane elastomer (trade name of "Elastolan XNY90A" manufactured by BASF Polyurethane Elastomers Co., Ltd.), 30 parts by weight of a thermoplastic polyamide elastomer (trade name of "Pebax 5533" manufactured by Atifina Japan Co., Ltd.) and 3 parts by weight of titanium dioxide were kneaded so that a resin composition was obtained. Next, a core was put in the mold shown in FIG. 3 and the resin composition was injected around the core. Thus, a golf ball including a cover having a thickness of 0.8 mm was obtained.

Example 2 and Comparative Example 1

A golf ball was obtained in the same manner as in the example 1 except that a mold having a pin type indicated in the following Table 1 was used.

Example 3

A golf ball including a cover having a thickness of 0.5 mm was obtained in the same manner as in the example 1 except that a core having a diameter of 41.7 mm was used.

Example 4

A golf ball including a cover having a thickness of 1.3 mm was obtained in the same manner as in the example 1 except that a core having a diameter of 40.1 mm was used.

Examples 5 to 7 and Comparative Examples 2 and 3

A golf ball was obtained in the same manner as in the example 1 except that a mold having gate and pin types indicated in the following Table 2 was used.

[Count of Generation of Defect]

A number of golf balls which is shown in each of the following Tables 1 and 2 were fabricated and the number of the generations of bare, the invasions of air and the generations of a weld mark were counted through inspection. Results are shown in the following Tables 1 and 2.

TABLE 1

Figure 7:
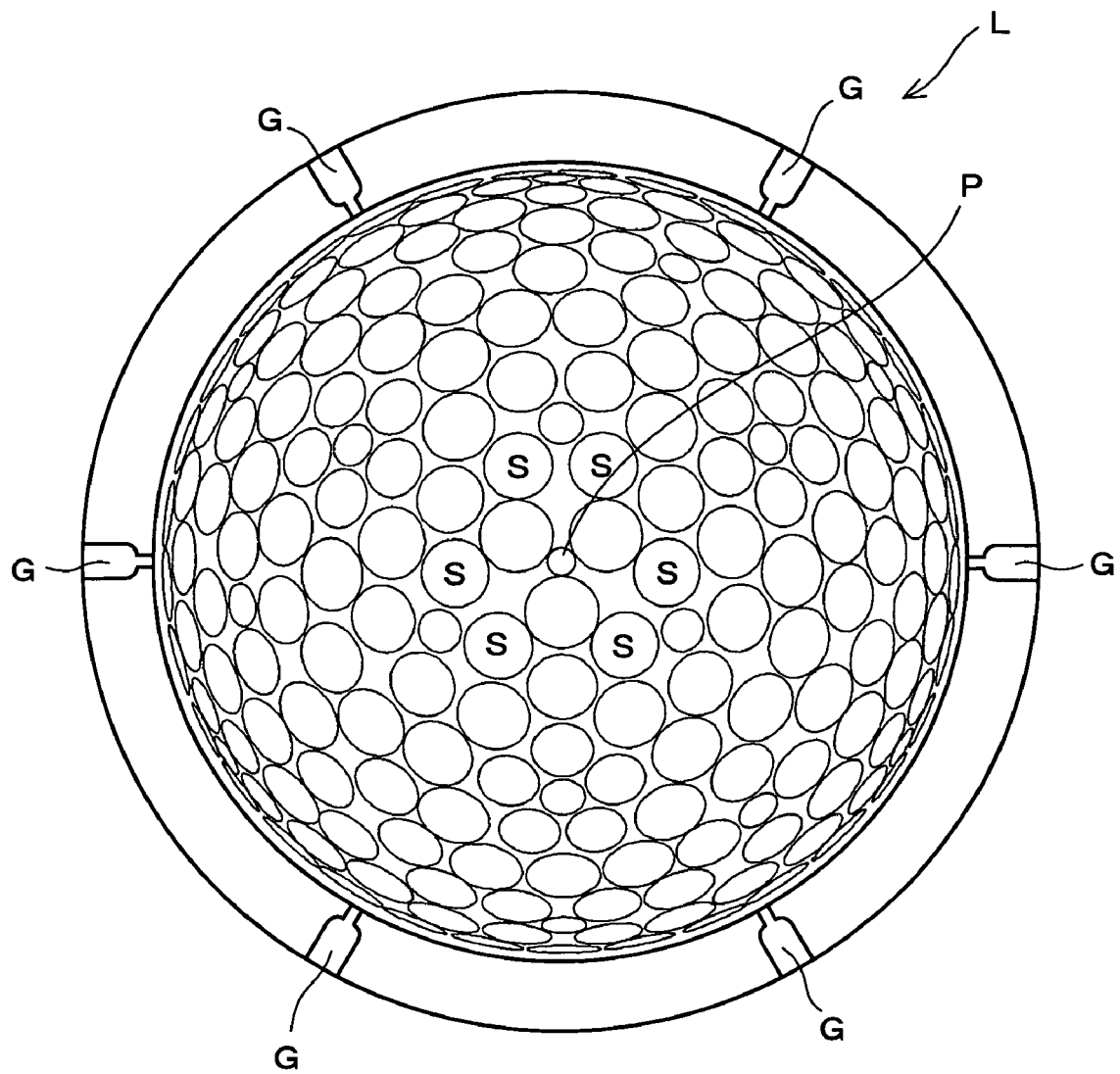
FIG. 7 is a plan view showing the lower mold half of a mold according to a comparative example 1.

| | | Result of Evaluation | | | | |
|---|---|---|---|---|---|---|
| | | Example 3 | Example 1 | Example 2 | Com. example 1 | Example 4 |
| Cover thickness (mm) | | 0.5 | 0.8 | 0.8 | 0.8 | 1.3 |
| Number of gates | | 6 | 6 | 6 | 6 | 6 |
| Type of mold | | FIG. 3 | FIG. 3 | FIG. 2 | FIG. 7 | FIG. 3 |
| Pole vent pin | Number | 1 | 1 | 1 | 1 | 1 |
| | Diameter (mm) | 1.45 | 1.45 | 1.45 | 1.45 | 1.45 |
| | Latitude (deg.) | 90.00 | 90.00 | 90.00 | 90.00 | 90.00 |
| | Clearance (μm) | 50 | 50 | 50 | 50 | 50 |
| Support pin | Number | 6 | 6 | 3 | 6 | 6 |
| | Diameter (mm) | 3.75 | 3.75 | 3.75 | 3.75 | 3.75 |
| | Latitude θs (deg.) | 74.26 | 74.26 | 74.26 | 74.26 | 74.26 |
| | Clearance (μm) | 10 | 10 | 10 | 10 | 10 |
| Intermediate vent pin (first) | Number | 3 | 3 | 3 | — | 3 |
| | Diameter (mm) | 3.75 | 3.75 | 3.75 | — | 3.75 |
| | Latitude θm (deg.) | 71.00 | 71.00 | 74.26 | — | 71.00 |
| | Difference from θs (deg.) | 3.26 | 3.26 | 0.00 | — | 3.26 |
| | Clearance (μm) | 10 | 10 | 10 | — | 10 |
| Intermediate vent pin (second) | Number | 3 | 3 | — | — | 3 |
| | Diameter (mm) | 2.40 | 2.40 | — | — | 2.40 |
| | Latitude θm (deg.) | 69.06 | 69.06 | — | — | 69.06 |
| | Difference from θs (deg.) | 5.20 | 5.20 | — | — | 5.20 |
| | Clearance (μm) | 40 | 40 | — | — | 40 |
| Number of manufactures | | 12500 | 12500 | 12600 | 9600 | 12600 |
| Number of generations of bare | | 0 | 0 | 0 | 351 | 0 |
| Number of invasions of air | | 0 | 0 | 0 | 1637 | 0 |
| Number of generations of weld mark | | 0 | 0 | 0 | 2671 | 0 |

TABLE

Result of Evaludation

Figure 8:
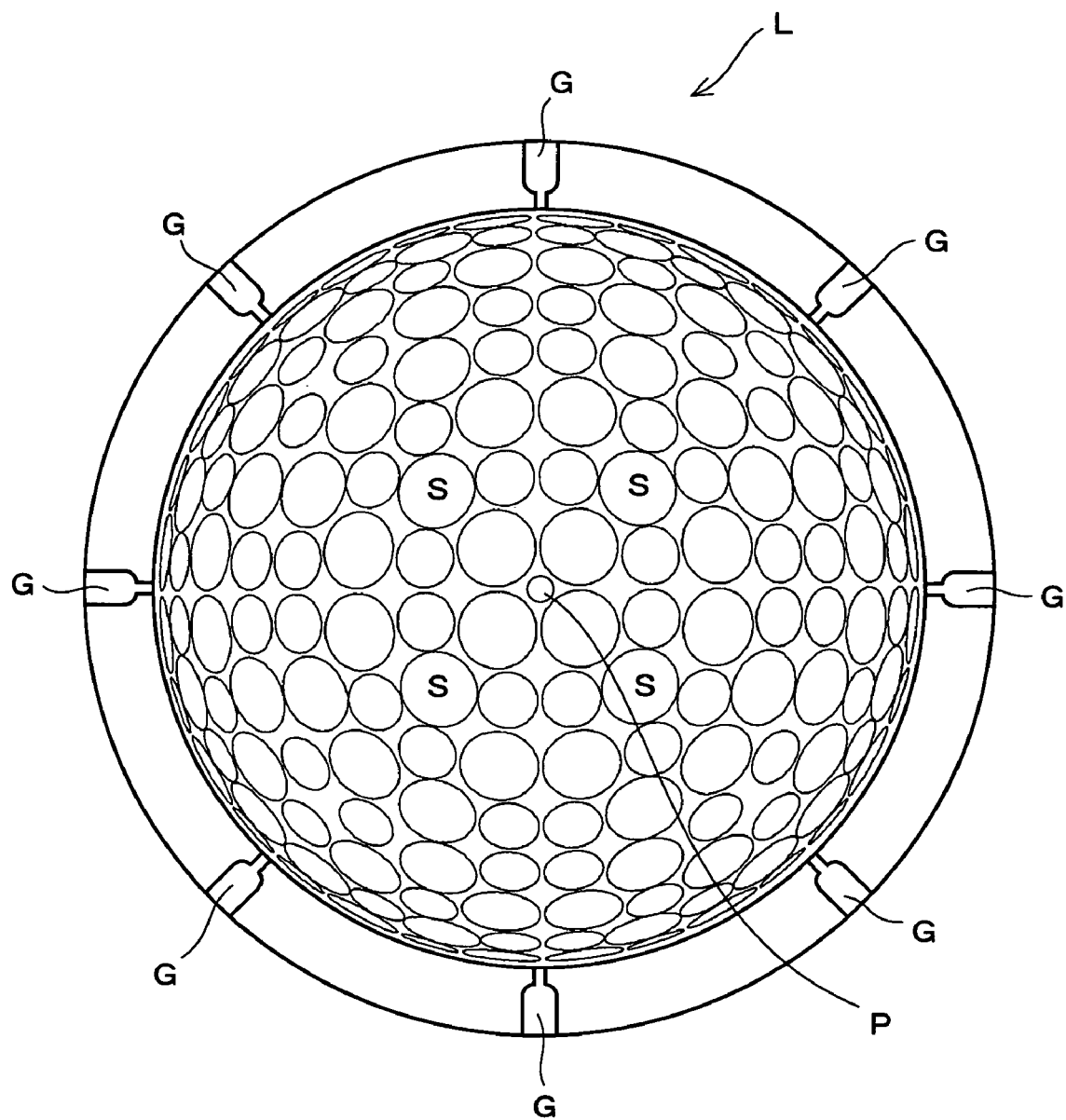
FIG. 8 is a plan view showing the lower mold half of a mold according to a comparative example 2.
Figure 9:
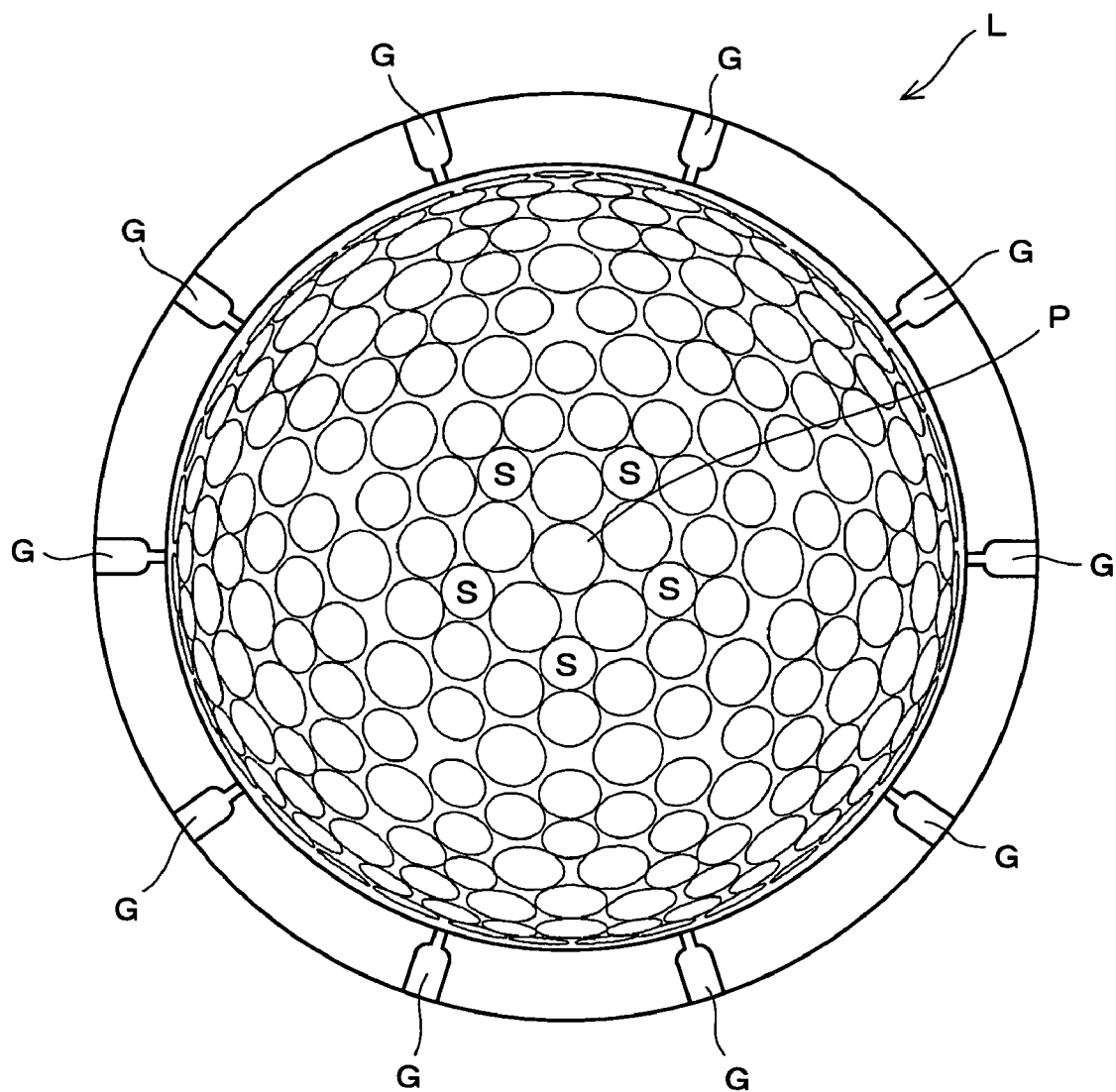
FIG. 9 is a plan view showing the lower mold half of a mold according to a comparative example 3.

|  |  | Example 5 | Com. example 2 | Example 6 | Example 7 | Com. example 3 |
|---|---|---|---|---|---|---|
| Cover thickness (mm) | | 0.8 | 0.8 | 0.8 | 0.8 | 0.8 |
| Number of gates | | 8 | 8 | 10 | 10 | 10 |
| Type of mold | | FIG. 4 | FIG. 8 | FIG. 5 | FIG. 6 | FIG. 9 |
| Pole vent pin | Number | 1 | 1 | 1 | 1 | 1 |
| | Diameter (mm) | 1.45 | 1.45 | 4.00 | 4.00 | 4.00 |
| | Latitude (deg.) | 90.00 | 90.00 | 90.00 | 90.00 | 90.00 |
| | Clearance (μm) | 50 | 50 | 10 | 10 | 10 |
| Support pin | Number | 4 | 4 | 5 | 5 | 5 |
| | Diameter (mm) | 4.50 | 4.50 | 3.15 | 3.30 | 3.15 |
| | Latitude θs (deg.) | 67.50 | 67.50 | 73.84 | 59.63 | 73.84 |
| | Clearance (μm) | 10 | 10 | 10 | 10 | 10 |
| Intermediate vent pin (first) | Number | 8 | — | 5 | 5 | — |
| | Diameter (mm) | 3.40 | — | 3.30 | 3.15 | — |
| | Latitude θm (deg.) | 49.65 | — | 59.63 | 73.84 | — |
| | Difference from θs (deg.) | 17.85 | — | 14.21 | 14.21 | — |
| | Clearance (μm) | 10 | — | 10 | 10 | — |
| Number of manufactures | | 12400 | 8400 | 12000 | 12400 | 9500 |
| Number of generations of bare | | 0 | 638 | 0 | 0 | 459 |
| Number of invasions of air | | 19 | 2652 | 4 | 0 | 2145 |
| Number of generations of weld mark | | 6 | 4365 | 0 | 0 | 3697 |

As shown in the Tables 1 and 2, the number of the generations of the defects in the manufacturing method according to each of the examples is smaller than that of the generations of the defects in the manufacturing method according to each of the comparative examples. From the results of the evaluation, the advantages of the present invention are apparent.

The above description is only illustrative and various changes can be made without departing from the scope of the present invention.

What is claimed is:

1. A method of manufacturing a golf ball comprising the steps of:
    putting a core in a mold including an upper mold half and a lower mold half and including a substantially spherical cavity and a plurality of gates, each of the upper mold half and the lower mold half containing a vent pin positioned on a pole, three to six support pins having latitudes θs of 45 degrees to 75 degrees, and at least three intermediate vent pins having latitudes θm of 45 degrees to 75 degrees, said intermediate vent pins being unmovable forward and backward with respect to the cavity; and
    injecting a molten polymer composition into the cavity through a gate while discharging air present in the cavity from a clearance provided by the intermediate vent pins, wherein every gate is present on the parting line, and the molten polymer composition passing through the gate is fluidized toward the pole from the parting line and wherein a difference between an inside radius of the cavity and a radius of the core at the injecting step is 0.3 mm to 0.8 mm.

2. The manufacturing method according to claim 1, wherein all of the support pins are provided at the same latitude in each of the upper mold half and the lower mold half.

3. The manufacturing method according to claim 1, wherein a clearance between the intermediate vent pin and a pin hole is 5 μm to 50 μm.

4. The method of claim 1, wherein the intermediate vent pins are provided at locations other than the pole whereby air is discharged from the clearance of the intermediate vent pins and the invasion of the polymer composition into the clearance is inhibited.

5. The method of claim 1, wherein air is discharged from the clearance of the intermediate vent pins in a portion in which fluidization of the polymer is hindered.

6. The method of claim 1, wherein the intermediate vent pins are provided between the gate and the pole vent pin.

7. A method of manufacturing a golf ball comprising the steps of:
    putting a core in a mold including an upper mold half and a lower mold half and including a substantially spherical cavity and a plurality of gates, each of the upper mold half and the lower mold half containing a vent pin positioned on a pole, three to six support pins having latitudes θs of 45 degrees to 75 degrees, and at least three intermediate vent pins having latitudes θm of 45 degrees to 75 degrees, said intermediate vent pins being unmovable forward and backward with respect to the cavity; and
    injecting a molten polymer composition into the cavity through a gate while discharging air present in the cavity from a clearance provided by the intermediate vent pins, wherein at least three intermediate vent pins in said upper mold half and said lower mold half have latitudes θm with a difference of 15 degrees or less from the latitudes θs of the support pins, wherein every gate is present on the parting line, and the molten polymer composition passing through the gate is fluidized toward the pole from the parting line and wherein a difference between an inside radius of the cavity and a radius of the core at the injecting step is 0.3 mm to 0.8 mm.

8. The method of claim 7, wherein the intermediate vent pins are provided at locations other than the pole whereby air is discharged from the clearance of the intermediate vent pins and the invasion of the polymer composition into the clearance is inhibited.

9. The method of claim 7, wherein air is discharged from the clearance of the intermediate vent pins in a portion in which fluidization of the polymer is hindered.

10. The method of claim 7, wherein the intermediate vent pins are provided between the gate and the pole vent pin.

* * * * *